United States Patent [19]

Vockenhuber

[11] Patent Number: 4,555,632
[45] Date of Patent: Nov. 26, 1985

[54] METHOD AND APPARATUS FOR ASCERTAINING THE DIMENSIONS AND POSITIONS OF FILM FRAMES ON COHERENT ROLL FILMS

[75] Inventor: Peter Vockenhuber, Concise, Switzerland

[73] Assignee: AGFA-Gevaert A.G., Leverkusen, Fed. Rep. of Germany

[21] Appl. No.: 538,999

[22] Filed: Oct. 4, 1983

[30] Foreign Application Priority Data

Oct. 6, 1982 [DE] Fed. Rep. of Germany ....... 3237053

[51] Int. Cl.$^4$ .......................... G01N 21/86; G01V 9/04
[52] U.S. Cl. ..................................... 250/560; 250/561
[58] Field of Search ............... 250/562, 572, 559, 560, 250/561, 571

[56] References Cited

U.S. PATENT DOCUMENTS

| | | | |
|---|---|---|---|
| 4,167,678 | 9/1979 | Mischo et al. ........................ | 250/559 |
| 4,217,648 | 8/1980 | Thurm et al. ......................... | 364/526 |
| 4,362,259 | 12/1982 | Stemme ................................ | 226/123 |

*Primary Examiner*—Shrive P. Beck
*Attorney, Agent, or Firm*—Peter K. Kontler

[57] ABSTRACT

The length of film frames on successive roll films which form an elongated strip of randomly alternating roll films with shorter and longer film frames is ascertained by advancing the strip stepwise past a photoelectronic monitoring device which generates signals denoting the light transmissivity of successive increments of the strip. Signals denoting the leaders of successive film frames are stored in a sample-and-hold circuit which replaces the stored signals with signals of greater intensity when the signals of greater intensity are generated during transport of a length of strip corresponding to the length of a longer film frame. This denotes that the corresponding roll film contains shorter film frames. The circuit transmits stored signals to memories one of which is addressed cyclically and the detected signals are totalized, during the monitoring of a given roll film, to furnish information as to the total number of stored signals, the total number of longer film frames (if any) and the total number of signals (if any) which replace stored signals during the monitoring of a length of a roll film which matches the length of a longer film frame. The thus obtained information is utilized to classify the roll films as those containing longer or shorter film frames, to provide the strip with notches denoting the positions of the film frames and of the splices between successive roll films, and the ordinal numbers of roll films with shorter film frames.

20 Claims, 1 Drawing Figure

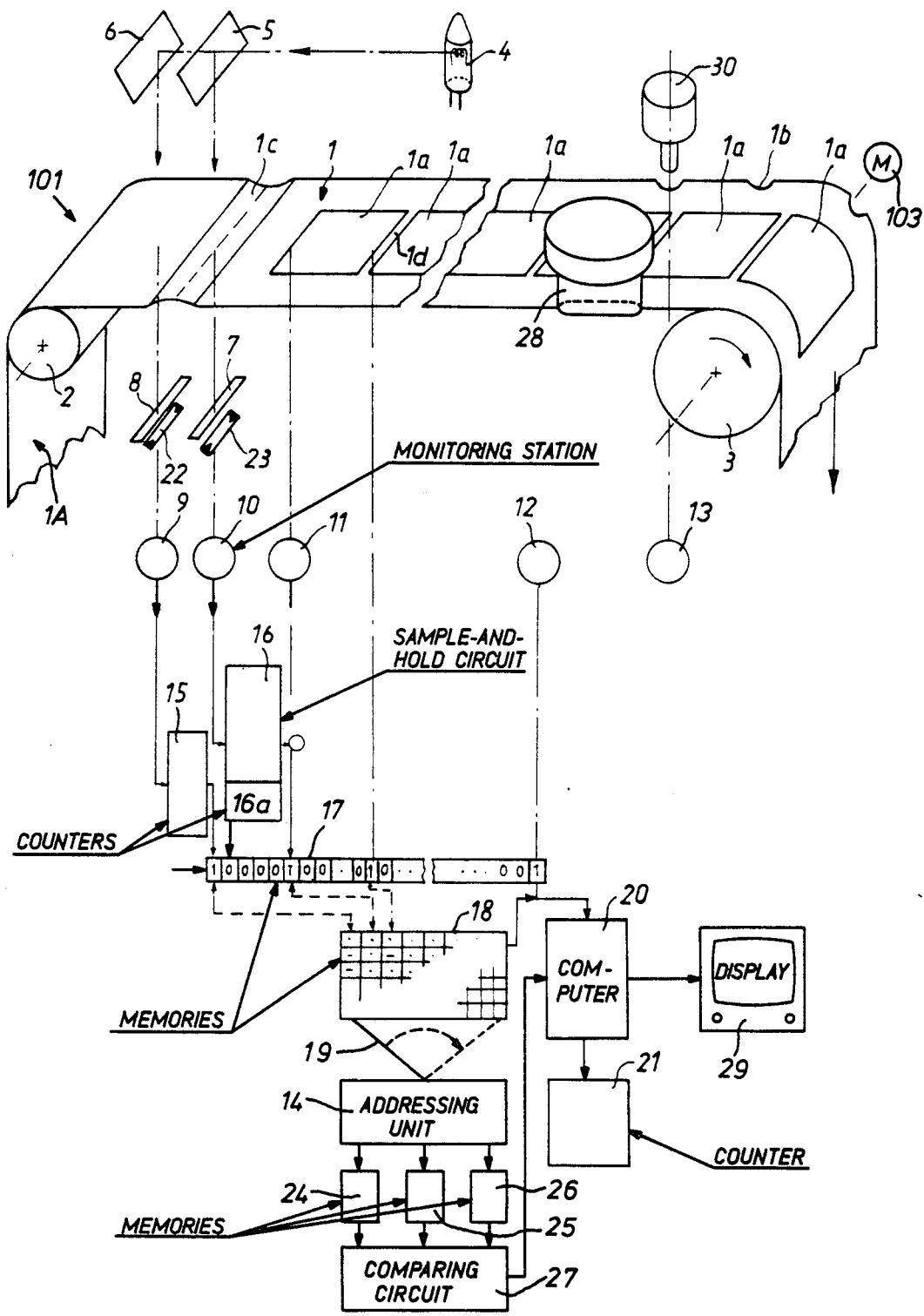

METHOD AND APPARATUS FOR ASCERTAINING THE DIMENSIONS AND POSITIONS OF FILM FRAMES ON COHERENT ROLL FILMS

BACKGROUND OF THE INVENTION

The present invention relates to improvements in a method and in an apparatus for ascertaining the dimensions and positions of film frames on roll films. More particularly, the invention relates to improvements in a method and apparatus for automatically ascertaining the positions and dimensions of frames on roll films with photoelectronic monitoring means. Still more particularly, the invention relates to improvements in a method and apparatus for ascertaining the dimensions and positions of film frames as considered in the longitudinal direction of a single roll film but especially in the longitudinal direction of a strip or web of spliced-together (coherent) roll films which may but need not have frames of different sizes.

German Pat. No. 1,285,317 discloses an apparatus which is used to provide a marginal portion of each roll film with a series of indicia or markers in the form of notches or the like, one for each film frame, in order to facilitate proper positioning of the respective film frames in a copying machine for the making of prints from exposed and developed photographic films. The arrangement is such that the distance between the monitoring station (where the dimensions of the film frames are ascertained) and the marking or indicia applying station is somewhat less than the combined length of two film frames, as considered in the longitudinal direction of the roll film. This renders it possible to verify the determination of the dimension of a film frame following detection of the leading edge of such frame by the monitoring device or devices before the indicia applying apparatus is actuated to provide the marginal portion of the roll film with a notch denoting the position of the freshly monitored film frame. Thus, the interval which elapses for advancement of an increment of roll film from the monitoring station to the indicia applying or marking station is sufficiently long to enable the monitoring device to detect the trailing edge of the film frame whose leading edge has been detected during a given interval and/or to detect other information which can be evaluated to reliably ascertain the dimensions of the freshly detected frame and to thus ensure that the notch will be applied in an optimum position for adequate positioning of the respective film frame in the copying machine. Such other information can constitute detection of the leader of the next-following film frame so that an evaluating system can readily ascertain the length of a film frame by the simple expedient of determining the distance between the leaders of two successive frames minus the anticipated or customary width of a frame line between such frames.

Another method of ascertaining the length of successive film frames on a roll film or a strip or web consisting of several roll films is disclosed in commonly owned U.S. Pat. No. 4,167,678 to Mischo et al. This patent discloses a method of relying on a parameter which is indicative of the actual length of film frames in a given roll film, such reliance ensuring a more predictable and more accurate determination of locations for the application of notches which facilitate proper positioning of film frames in the copying machine. The distance between the monitoring or scanning station and the indicia applying station equals between five and six times the length of a film frame, as considered in the longitudinal direction of the monitored roll film. This ensures that the failure of monitoring means to detect the leading edge and/or the trailing edge of one or more film frames does not detract from reliability of the monitoring operation and of the application of notches in optimum positions for adequate positioning of the film frames in the copying machine. The same holds true if one or more frames are not detectable at all, e.g., due to failure to expose such frames prior to removal of a roll film from the camera. Detection of the remaining leading and/or trailing edges between the spaced-apart monitoring and indicia applying stations of the apparatus which is disclosed in the patent to Mischo et al. suffices to ensure predictable detection of the length of film frames and proper application of notches or other forms of indicia. The information which is gathered by the monitoring device while a length of roll film advances from the monitoring to the indicia applying station can be processed in a computer or by interpolation.

A drawback of each of the just described prior apparatus is that the apparatus must receive information pertaining to the actual length of film frames. In other words, the apparatus which are disclosed in the aforementioned patents can ensure proper positioning of notches or other types of indicia relative to the corresponding film frames only upon receipt of advance information pertaining to the actual length of film frames on roll films wnich are caused to pass through such apparatus. This is due to the fact that these apparatus must be set up to furnish scanning intervals not longer than that which is necessary to transport a film frame past the monitoring station.

Large-scale film processing laboratories presently treat exposed and developed films in the form of long strips or webs containing a substantial number of successive roll films which are spliced together end-to-end and often contain, or are likely to contain, roll films having frames of different sizes. Though the number of roll films with 24×36 film frames still prevails, the number of roll films having square film frames (24×24 mm) or so-called half formats (18×24 mm) is steadily on the increase. This renders it impossible to properly identify the frames on a web or strip consisting of several roll films with different film frames by resorting to the aforediscussed conventional monitoring and indicia applying apparatus. Advance determination of the dimensions of film frames on successive spliced-together roll films would be too cumbersome and practically impossible at speeds which are necessary in a modern processing laboratory.

German Pat. No. 1,953,014 discloses an apparatus which is capable of automatically detecting the formats of successive film frames. However, this apparatus is highly complex, sensitive and impractical because it necessitates the transport of strips of roll films therethrough in advance of the transport of such strips into a copying machine. In other words, each strip must be conveyed first through the patented apparatus and is thereupon introduced into the conveyor system which advances the film frames through the copying machine.

OBJECTS AND SUMMARY OF THE INVENTION

An object of the invention is to provide a novel and improved method of automatically ascertaining the dimensions of film frames on successive roll films immediately preceding the application of indicia which are indicative of the positions of film frames.

Another object of the invention is to provide a method which can be used with advantage to discriminate between several sizes of film frames.

A further object of the invention is to provide a method which can be resorted to for determination of the length of successive film frames forming part of spliced-together roll films with identical or different film frames and for pinpointing of the positions of such film frames.

An additional object of the invention is to provide a method which can be resorted to for automatic determination of the length of film frames even if some film frames are hardly discernible or not discernible at all.

Another object of the invention is to provide a method which ensures satisfactory identification of long, medium-long or short film frames as well as adequate identification of splices between successive roll films which together constitute a long strip or web of coherent roll films.

A further object of the invention is to provide a novel and improved apparatus for the practice of the above outlined method.

An additional object of the invention is to provide an apparatus which can be used immediately ahead of a printing or copying machine to adequately identify successive film frames by indicia or markers in the form of notches or the like in order to allow for accurate positioning of film frames in the copying machine.

Another object of the invention is to provide the apparatus with novel and improved means for processing signals denoting various features of film frames and frame lines in successive roll films of a web or strip of spliced-together roll films.

A further object of the invention is to provide the apparatus with novel and improved means for gathering information pertaining to various characteristics of successive roll films and roll film frames in a strip of coherent roll films.

One feature of the invention resides in the provision of a method of automatically ascertaining the locations and the length of image areas (particularly the frames of exposed and developed photographic roll films) in each of a series of successive portions of an elongated strip of photosensitive material (such as a strip consisting of a series of roll films which are spliced together end-to-end so that the splices constitute the boundaries between successive roll films) wherein portions having longer image areas (e.g., 24×36 mm) alternate at random with portions having shorter image areas (e.g., 24×24 mm or 18×24 mm) and wherein successive image areas in each portion of the strip alternate with non-image areas (such non-image areas can constitute frame lines and the frame lines in each portion of the strip can be assumed to have identical or practically identical widths, as considered in the longitudinal direction of the strip). The method comprises the steps of effecting a relative movement between the strip and a monitoring station (e.g., a station for a suitable photoelectronic monitoring device which is preferably stationary while the strip is advanced stepwise by a stepping motor through the medium of one or more rolls which can have teeth extending into marginal perforations of the strip), photoelectrically monitoring at such station the radiation-transmissivity of successive narrow transversely extending increments of the strip during successive intervals which elapse for relative movement between the monitoring station and a longer image area and generating signals denoting the monitored transmissivity (the intensity of signals which are generated during monitoring of non-image areas deviates from that of signals which are generated during monitoring of image areas and the sign of deviation depends upon whether the film is a reversal film or a negative film), storing the signal which is generated as a result of monitoring the non-image area in front of each longer or shorter image area, replacing each stored signal with a second signal (if any) whose intensity deviates at least slightly from the intensity of the stored signal, which is generated during the interval following storage of the signal denoting the monitoring of a non-image area in the course of relative movement between the monitoring station and a given portion of the strip and which is indicative of a non-image area, and utilizing the stored signals as a criterion of the length of image areas in the corresponding portions of the strip. The generation of a second signal is indicative of a shorter image area. The utilizing step can comprise computing the number of stored second signals during monitoring of a given portion of the strip, i.e., ascertaining the frequency at which second signals replace previously stored signals during the periods which elapse for the monitoring of a given portion of the strip.

In accordance with a presently preferred embodiment of the method, the utilizing step includes totalizing the number (E) of stored signals during the monitoring of a given portion of the strip, totalizing the number (V) of signals (if any) denoting the monitoring of non-image areas preceding longer image areas, and totalizing the number (H) of second signals (if any) during monitoring of the same portion of the strip. The monitored image areas of a given portion of the strip are classified as longer image areas when the total number (E) of stored signals exceeds two and the total number (H) of second signals is zero. The monitored image areas of a given portion of the strip are classified as shorter image areas when the total number (E) of stored signals exceeds two, when at least two signals of such total number are second signals, and if at least one of the following three conditions is satisfied: $H=V$, $H+V=E$, and $H+V-1=E$.

Still further, the method can comprise the step of comparing the monitored transmissivity of successive increments of the strip with a predetermined maximum transmissivity (e.g., the maximum possible transmissivity of the strip) and, for the purpose of classifying the monitored image areas of a given portion of the strip as longer or shorter image areas, increasing the total number (E) of signals to more than three when the signals of such total number denote a transmissivity which is less than a certain percentage (e.g., approximately 80 percent) of the maximum transmissivity.

The method preferably further comprises the step of providing the strip with first indicia (e.g., with notches in one marginal portion of the strip) denoting the position of each and every longer and each and every shorter image area, and providing the strip with second indicia (e.g., with notches in the other marginal portion of the strip) denoting the boundaries (splices) between successive portions of the strip. Still further, the method can comprise the steps of ascertaining the ordinal numbers of film portions with shorter image areas and displaying the ordinal numbers, for example, for the purpose of facilitating separation of portions with shorter image areas from portions with longer image areas so that such portions can be assembled into several strips each having portions with image areas of the same length.

The application of indicia denoting the image areas of portions with shorter image areas can be carried out in the following way: The strip is provided with a first indicium at a predetermined distance from the leader of the foremost shorter image area of the portion in question, the strip is then provided with a second indicium at a predetermined distance from the trailing edge of the foremost image area, and the strip is thereafter provided with additional indicia at predetermined distances from the leaders of the third and next-following image areas of the respective portion of the strip. For example, the first indicium can be applied at a standard distance of 9 mm from the leading edge of the foremost short image area if the length of such image area is 18 mm (as considered in the longitudinal direction of the strip). The second indicium is then applied at the same distance from the trailing edge of the foremost shorter image area, and each next-following indicium is applied at the same distance from the leader or leading edge of the respective (third, etc.) shorter image area.

Another feature of the invention resides in the provision of an apparatus for the practice of the above outlined method, i.e., in the provision of an apparatus for automatically ascertaining the locations and the length of image areas (particularly film frames) in each of a series of successive portions of an elongated strip of photosensitive material wherein portions having longer image areas (e.g., 24×36 mm) alternate at random with portions having shorter image areas (e.g., 24×24 mm or 18×24 mm) and wherein successive image areas in each portion of the strip alternate with non-image areas, particularly with frame lines which are assumed to have identical widths, at least in the respective portion of the strip. The apparatus comprises a photoelectronic radiation-transmissivity monitoring device, means for effecting a relative movement between the monitoring device and the strip so that the monitoring device generates signals denoting the transmissivity of successive narrow transversely extending increments (each such increment can have a length of 0.2 mm) of the strip during successive intervals which elapse for relative movement between the monitoring device and a longer image area (the intensity of signals which are generated during monitoring of image areas deviates from that of signals which are generated during monitoring of non-image areas), means (e.g., a sample-and-hold circuit) for storing the signal which is generated as a result of monitoring the non-image area in front of each shorter or longer image area including means for replacing each stored signal with a second signal (if any) whose intensity deviates at least slightly (e.g., by 5 percent) from the intensity of the stored signal, which is generated during the interval following storage of the signal denoting the monitoring of a non-image area in the course of relative movement between the monitoring device and a given portion of the strip and which is indicative of a non-image area, and means for utilizing the stored signals as a criterion of the length of image areas in the corresponding portions of the strip including means for ascertaining the frequency at which second signals replace stored signals during the periods which elapse for the monitoring of a given portion of the strip.

The storing means can comprise means for counting the number of monitored increments subsequent to storage of a signal denoting the non-image area in front of an image area and for altering the extent of deviation of the intensity of a freshly generated signal from the intensity of the then stored signal when the extent of relative movement between the monitoring device and the strip approximates the length of a shorter image area. Such apparatus further comprises at least one memory which receives signals from the storing means in response to reception by the latter of a second signal, and the utilizing means of such apparatus includes means for cyclically addressing the memory for the presence of signals. Such utilizing means further comprises means for counting the total number (E) of signals which are transmitted to the memory during the monitoring of a given portion of the strip, the total number (V) of non-image areas (if any) preceding the longer image areas of a given portion of the strip, and the total number of second signals which are generated during monitoring of such given portion of the strip.

The apparatus preferably further comprises means for applying to the strip first indicia denoting the position of each and every shorter and each and every longer image area, and means for applying to the strip second indicia denoting the boundaries (e.g., splices) between successive portions of the strip. Still further, the apparatus preferably comprises (or the utilizing means comprises) means for counting the ordinal numbers of successive portions with shorter image areas and for displaying such ordinal numbers.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a schematic partly perspective view of a novel apparatus which can be utilized for the practice of the improved method.

DESCRIPTION OF THE PREFERRED EMBODIMENTS

The drawing illustrates a portion of a strip or web 101 of coherent roll films including a first roll film 1 and a second roll film 1A. The films 1 and 1A are joined end-to-end by a splice 1c, e.g., a splice including a strip of adhesive tape extending transversely of the longitudinal direction of the strip 101. The front roll film 1 comprises a series of at least substantially equidistant image areas or film frames 1a which are separated from one another by non-image areas or frame lines 1d of predetermined width. Each of the roll films 1, 1A is assumed to be a negative film which has been exposed in a camera and was thereupon processed in a developing machine. The purpose of the apparatus is to ascertain the length and the location of each frame 1a on the roll film 1 as well as the position and length of each frame (not specifically shown) on the next-following roll film 1A and to provide the marginal portion of the strip 101 with indicia or markers in the form of notches 1b each of which assumes a predetermined position with reference to the respective film frame. Each marginal portion of the strip 101 of roll films 1, 1A is further provided with a row of customary perforations which facilitate the transport of roll films in cameras and in the developing and copying machines; such perforations have been omitted for the sake of clarity.

The notches 1b are applied by a punching device 30 of conventional design, and the purpose of such notches is to ensure satisfactory positioning of the respective film frames in the copying machine which is assumed to be located to the right of the illustrated apparatus or which embodies such apparatus.

The nature of adhesive tape which forms the splice 1c is preferably such that it absorbs substantial amounts of infrared radiation. Therefore, each splice 1c can be readily detected by infrared radiation detector means including a receiver 22 in that each adhesive tape appreciably changes the permeability of the corresponding portions of the roll films 1 and 1A to infrared light.

The strip 101 of films 1, 1A and as many additional roll films as desired or necessary is trained over an idler roll 2 and a second roll 3 which is driven intermittently by a stepping motor 103 of known design. It is preferred to provide a third roll (see the roll 3A in FIG. 1 of Mischo et al.) which is biased toward the roll 3 so that such rolls form a nip for successive increments of the strip 101 of roll films 1, 1A. The additional roll guarantees predictable advancement of the strip 101 in response to rotation of the driven roll 3. The arrangement is such that each indexing of the roll 3 by the stepping motor 103 involves an advance of the strip 101 through a distance of 0.2 mm. Otherwise stated, five steps are necessary in order to advance the strip 101 through a distance of 1 mm.

The apparatus further comprises a radiation source 4 which, in the illustrated embodiment, is disposed at a level above the path of the strip 101 between the rolls 2, 3 and directs radiation toward a partially transmitting mirror 5 serving to direct a certain percentage of incident radiation against successive increments of the strip 101 between the rolls 2 and 3. The mirror 5 reflects the visible part of incident radiation, especially the blue component of light, upon the strip 101 of roll films and the beam of coherent light which has penetrated through the strip 101 impinges upon a photoelectronic transducer 23 after having passed through an elongated narrow scanning slot 7 extending transversely of the direction of advancement of roll films 1, 1A between the rolls 2 and 3. The width of the scanning slot 7 equals 0.2 mm. That fraction of radiation which is emitted by the source 4 and passes through the mirror 5 is fully reflected by a second mirror 6 which directs such light toward the strip 101 of roll films between the rolls 2, 3 ahead of the mirror 5 (as considered in the direction of advancement of the strip). The radiation which is reflected by the second mirror 6 is primarily infrared light, and such light impinges upon the infrared radiation detector or receiver 22 after having passed through a second narrow elongated scanning slot 8 which is disposed between the mirror 6 and the detector 22. The purpose of the detector 22 is to generate signals in response to detection of successive splices 1c, i.e., in response to absorption of appreciable amounts of infrared light by the adhesive tapes at the boundaries between successive roll films of the strip.

The distance between the scanning slots 7 and 8 equals or approximates half the length of a film frame, as considered in the longitudinal direction of the strip 101 between the rolls 2 and 3. The distance between these scanning slots can be altered (i.e., it can be greater or less); this depends on the nature of the evaluating circuit which is used in the improved apparatus. The detector 22 is disposed at a position or locus 9 ahead of the position or locus 10 (monitoring station) of installation of the photosensitive transducer 23. The output of the detector 22 is connected with a combined counter and time-delay unit 15 whose output is connected with the first stage of a shift register 17 constituting a signal storing device of the improved apparatus. The delay which is produced by the unit 15 corresponds to the interval of time which is required to advance an increment of the strip 101 of roll films from a position of register with the first scanning slot 7 into register with the second scanning slot 8. The signals which are transmitted by the detector 22 and by the output of the unit 15 are indicative of detection of successive splices 1c.

The transducer 23 transmits signals to the input of a signal storing sample-and-hold circuit 16 for the generation of a holding function which can be resorted to in order to ascertain the maximum light transmissivity of negative film in the region between the locations 10 and 11 adjacent to the path of the strip 101 of roll films between the rolls 2 and 3. The details of the circuit 16 are fully described in German Pat. No. 1,285,317 and also in the aforementioned patent to Mischo et al. The arrangement is such that the transducer 23 transmits a fresh signal after each intermittent advance of the strip 101 of roll films, and such fresh signal is compared with the previously generated signal which is temporarily stored in the sample-and-hold circuit 16. If the intensity or another characteristic of the freshly generated signal exceeds the corresponding characteristic of the stored signal, the stored signal is replaced with the fresh signal which latter thereupon serves as a reference signal for comparison with the next-following signals. The stored signal is replaced with a fresh signal only if the intensity of the fresh signal exceeds that of the stored signal. The mode of operation of the circuit 16 is preferably such that a stored signal is erased and replaced with a freshly generated signal only when the intensity of the fresh signal exceeds the intensity of the stored signal by a predetermined value, e.g., by five percent. This is desirable and advantageous in order to ensure that the apparatus does not "lose" previously detected frame lines 1d due to insignificant fluctuations of brightness or light-transmissivity of the material of roll films. The just discussed construction and mode of operation of the sample-and-hold circuit 16 ensure reliable detection of the maximum light transmissivity value of film within a preselected length of the body of film between the rolls 2 and 3 or within a selected interval of time.

The reliability with which the improved apparatus detects film portions of maximum light transmissivity (i.e., the leading and/or trailing edges of successive film frames) is enhanced still further by resorting to the so-called gradient criterion. This means that the apparatus ascertains whether or not the light-transmissivity of roll film decreases abruptly and appreciably when the trailing edge of a frame line 1d moves past the monitoring device including the mirror 5 and the transducer 23. In other words, the monitoring device first detects the presence of the leading edge of a frame line 1d between the mirror 5 and the slot 7 by ascertaining a pronounced increase of light-transmissivity. Such transmissivity decreases pronouncedly when the trailing edge of the frame line 1d of a negative film advances past the scanning slot 7, and this is detected by the apparatus for the purpose of further enhancing the reliability of detection of successive film frames and the accuracy of application of notches 1b to identify such film frames. This will be readily appreciated since the frame lines in an exposed and developed negative film are much lighter than the film frames.

The apparatus can further monitor additional criteria, such as the trailing edge of a film frame 1a following detection of the trailing edge of the preceding frame line 1d, in order to further enhance the reliability of detection of film frames and of proper application of corresponding notches 1b.

The sample-and-hold circuit 16 delays the transmission of signals to the shift register 17. The arrangement is preferably such that the transmission of signals from the output of the sample-and-hold circuit 16 to the shift register 17 is delayed by an interval required to monitor a length of the strip 101 which is somewhat less than the length of the longest film frame, e.g., a length in the range of 30 mm (the longest film frame being assumed to measure 36 mm and the next-longest film frame being assumed to measure 24 mm). The length of less than the full length of the longest film frame is monitored for eventual detection of signals whose intensity exceeds that of the signal which is already stored in the sample-and-hold circuit 16. If this is not the case, the apparatus "assumes" that the previously detected location, which has caused the generation of a maximum-intensity signal by the transducer 23 behind the scanning slot 7, in fact denotes the location of the leading or trailing edge of a film frame. In other words, the apparatus then "confirms" that the portion of maximum light transmissivity is located more than 30 mm ahead of the last portion of the scanned length of film 1 before the output of the circuit 16 transmits a signal to the shift register 17. The transmission of information from the output of the circuit 16 to the shift register 17 takes place at the location 11.

The purpose of a counter 16a, which forms part of or is connected with the circuit 16, is to count the number of stepwise advances of the strip 101 of roll films, subsequent to provisional detection of the leader of a film frame, which would be necessary to advance the strip by the length of a relatively short film frame, i.e., a frame whose length is less than 36 mm. For example, if the setting of the counter 16a is such that the apparatus is to detect the presence of half-length film frames (18×24 mm), the counter 16a counts eightyfive steps or increments, which amounts to a total distance of 17 mm, and thereupon opens an imaginary "electronic window" as a result of a change in the mode of scanning. In this window, the threshold for detection of a fresh extreme value is raised, for example, by 5% to 110% of the previous value. This also entails erasure of information which was contained in the counter and in the memory. Such mode of operation ensures that data pertaining to the previous extreme values are erased from the counters and memories only in response to an unequivocal increase of light transmissivity. If the light transmissivity is substantially the same, the sample-and-hold circuit 16 transmits a signal denoting the presence of a "frame line in the window". However, and since a signal for a detected frame line or film frame is to appear only at the location 11, i.e., after the counter 16a has counted eightyfive steps, the signal denoting a detected "frame line in the window" from the counter 16a to the shift register 17 must be transmitted at another location, namely, 85 steps or increments earlier.

The signal transporting pulses for advancement of information from stage to stage of the shift register 17 can be supplied by a pulse generator which is driven by the stepping motor 103 for the roll 3. This shift register is or can be termed a so-called "event-recording memory" which stores a signal in response to detection of a special or significant portion of the light transmissivity curve. If the monitoring operation does not result in detection of such special or significant portion or portions of the curve, the corresponding step entails the storage of a "0" signal. Admission of signals into the shift register 17 takes place in parallel with transmission of information into a data memory 18. Signals denoting the corresponding ascertained signals for the making of a holding function are stored in the data memory 18 wherein each line corresponds to an "event" in the shift register 17 and is assigned a predetermined position. The data which are stored in the memory 18 are shifted forwardly into the next row upon completed processing of an "event" by the shift register 17 in a following evaluating circuit so that, here again, one achieves a continuity of information.

As the scanned portion of the strip 101 advances to the location 12, together with the corresponding data in the shift register 17 and memory 18, such data are transmitted for processing into an evaluating unit 20, e.g., a computer. The data which are stored in the shift register 17 and memory 18 undergo only a logical evaluation, e.g., whether the mutual spacing of frame lines 1d is correct, whether or not signals denoting the leaders and trailing edges of film frames which have been detected as a result of measurement or monitoring should be replaced with signals which were ascertained on the basis of calculation (as in the aforementioned patent to Mischo et al.), etc. The thus ascertained locations of the frame lines are denoted by signals which are transmitted to the counter 21 which counts the number of steps between the location 12 and a location 13 which is the station for the making of notches 1b. The punching device 30 is actuated when the counter 21 completes the counting of a requisite number of steps which are necessary to advance an increment of the strip 101 from the location 12 to the location 13.

Information denoting the length of film frames must be obtained not later than for the carrying out of a comparison between the information which is stored in the shift register 17 and that which is stored in the data memory 18.

The means for ascertaining the length of film frames after a splice 1c has been advanced past the scanning slot 8 and detector 22 comprises an addressing unit 14 which repeatedly scans the contents of the memory 18 by way of a mobile scanner 19. To this end, the scanner 19 advances from the left-hand marginal portion of the memory 18 toward the right-hand marginal portion. When the memory 18 contains information denoting detection of a splice 1c, the scanning operation by the part 19 ends right there. In the absence of such information in the memory 18, the scanner moves all the way to the right-hand end. When the scanner 19 reaches the right-hand end of the memory 18, it returns to its starting position subsequent to processing of the detected "events", and the scanning operation begins anew, always from the left-hand end toward the right-hand end of the memory 18. The addressing unit 14 classifies the thus detected information in several categories, namely, either in a so-called "event" memory 24 which contains information denoting the total number of events E in the scanned portion of the strip 101 of roll films, or in a memory 25 which stores information V denoting the number of signals denoting the total number of full-sized (longer) film frames in the scanned portion of the strip 101 and hence also denoting the number of detected leading edges of film frames which are located outside of the aforementioned electronic window, or a third memory 26 for storage of signals H denoting the presence of "frame lines in the window", i.e., the number of detected half-size film frames.

The outputs of the memories 24, 25 and 26 are connected with a comparing circuit 27 whose output is connected with the corresponding input of the computer 20. The purpose of the comparing circuit 27 is to transmit signals which are based on logical comparisons of the contents of the memories 24 to 26, and such signals denote the detected size of film frames. The computer 20 has a first output which is connected to the counter 21 which activates the punching device 30 and a second punching device 28 (for the making of indicia denoting the positions of splices 1c) at required intervals, and a second output connected to a display unit 29 which is desirable when the strip 101 of roll films is rather long. The unit 29 serves to indicate the locations of roll films containing film frames other than the customary 24×36 format. This is expressed by the ordinal numbers of the corresponding splices 1c. Such detection of roll films having other (shorter) than anticipated film frames renders it possible to detect the respective roll films and to segregate them from the remaining roll films with film frames having a size of 24×36 mm so that the less frequently occurring roll films can be assembled into a separate strip or web and processed independently of the remaining roll films.

The operation is as follows:

In view of the relatively short distance between the locations 11 and 12, it is necessary to ensure that the dimensions of film frames are ascertained as early as possible during each of the recurring monitoring operations, not later than when the splice 1c reaches the location 12. It has been found that, to this end, the "event" memory 24 must contain at least three (more than two) signals denoting the respective events E. However, the total number of three events E suffices only if the detected maximum light transmissivity of the ascertained frame lines exceeds 80 percent of the maximum possible light transmissivity. If this condition is not fulfilled, the number of events E must be increased to four (more than three) or more.

A roll film which contains full-sized (24×36 mm) frames 1a is detected when none of the aforementioned three or four events are stored in the memory 26, i.e., if the monitoring did not result in detection of "a frame line in the window". However, if the memory 26 stores at least two bits of information, the presence of a roll film with half-sized (18×24 mm) frames is confirmed if at least one of the following three conditions is also satisfied, namely, $H = V$ $H + V = E$ $H + V - 1 = E.$ The comparing circuit 27 then transmits to the computer 20 a signal denoting the presence of a roll film containing half-size film frames. This terminates the activity of the addressing circuit 14, i.e., the circuit 14 remains idle once the circuit 27 transmits a signal denoting the detection of a roll film with frames having the minimal size of 18×24 mm.

When the splice 1c arrives at the location 13, the computer 20 already contains information pertaining to the format of film frames so that the counter 21 then activates the punching device 28 which applies a notch or another type of indicium denoting the presence of a roll film with film frames other than those having the maximum dimensions. At the same time, the display unit 29 also receives a signal to indicate the presence of such other-than-normal roll film by displaying the ordinal number of the respective splice 1c.

Once the length of film frames in a roll film is known, it is possible to actuate the punching device 30 with a high degree of accuracy in order to denote the positions of film frames having the anticipated maximum length or the positions of 24×24 mm or 18×24 mm film frames. This is achieved, for example, for the positions of 18×24 mm frames by counting the number of steps from the detected leaders of film frames for the maximum format and for the next following 18×24 negative frame starting in the other direction from the trailing frame line of the full format which latter, too, has been ascertained with a high degree of accuracy outside of the electronic window. As frame lines within the electronic window do not erase the previous extreme value, special measures are necessary, namely a shift of signal storing for 85 steps, as described earlier, or backward counting from the trailing frame line.

The next-following smaller-than-normal film frame is again identified by the application of a notch after counting a certain number of steps starting from the next-following preceding frame line.

Depending on the sophistication of equipment which is available in a processing laboratory, the apparatus can be provided with means for evaluating the information pertaining to the length of film frames.

The simplest mode of evaluation involves severing a strip to segregate therefrom those roll films whose film frames deviate in format from the majority of (longest) film frames in dependency on the information which is displayed by the unit 29. In a more fully automated apparatus, detection of notches which are made by the punching device 28 entails an automatic change of the dimensions and/or the position of the window in the copying machine and the mode of operation of means for advancing the strip of photographic paper in the copying machine so that the roll films having smaller-than-anticipated film frames need not be separated from other roll films.

If the strip 101 is assembled of reversal films, the frame lines constitute portions of minimum transmissivity. This necessitates an appropriate modification of the improved apparatus by ensuring that the signals denoting the presence of frame lines are generated in response to detection of portions of minimum transmissivity. Thus, the transmissivity increases abruptly when the monitoring system detects the leader of a film frame, and such transmissivity decreases abruptly when the trailing portion of a film frame advances beyond the scanning slot.

If the strip 1 is assembled of spliced-together randomly distributed roll films 1, 1A as well as additional roll films with square (24×24 mm) film frames, the apparatus is equipped with a second addressing unit 14, with a second set of memories 24–26, and with a second comparing circuit 27 which latter is also connected to the computer 20 und furnishes information pertaining to the presence or absence of square film frames. The device 29 then displays information regarding the detection of roll films (strip portions) with square or half-sized film frames, or the apparatus is provided with two information displaying devices.

An important advantage of the improved method and apparatus is that the scanning interval corresponds to that which is needed for detection of longest film frames. This renders it possible to employ the improved method and apparatus for detection of longest, medium-long or shortest film frames with the same degree of reliability. All that is necessary is to resort to the aforementioned theoretical electronic window which renders it possible to ascertain whether or not the film portion behind the window contains a frame line having the same light transmissivity as the previously located frame line. The evaluation of signals H ("a frame line in the window") renders it possible to reliably ascertain the presence or absence of shorter film frames in a relatively short scanning zone which need not contain more than five film frames at a time.

The manner in which a strip of roll films, which have been processed in accordance with the method and in the apparatus of the present invention, can be transported and treated in a copying machine is disclosed, for example, in commonly owned U.S. Pat. No. 4,362,259 granted Dec. 7, 1982 to Stemme et al.

The use of sample-and-hold circuits, a computer and integrating circuits in an apparatus which evaluates strips of photosensitive material prior to copying is disclosed in commonly owned U.S. Pat. No. 4,217,648 granted Aug. 12, 1980 to Thurm et al.

The components 15, 16 and 16a are realized by a microprocessor marketed by Intel under the number 8741A, the components 17, 18, 19, 20, 14, 24, 25, 26, 27 and 21 by an Intel processor with the number 8085.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of automatically ascertaining the locations and the length of image areas, particularly film frames, in each of a series of successive portions of an elongated strip of photosensitive material wherein portions having longer image areas alternate at random with portions having shorter image areas and wherein successive image areas of each portion alternate with non-image areas, particularly with frame lines, comprising the steps of effecting a relative movement between the strip and a monitoring station; photoelectrically monitoring at said station the radiation-transmissivity of successive narrow transversely extending increments of the strip during successive intervals which elapse for relative movement between said station and a longer image area and generating signals denoting the monitored transmissivity whereby the intensity of signals which are generated during monitoring of non-image areas deviates from that of signals which are generated during monitoring of image areas; storing the signal which is generated as a result of monitoring the non-image area in front of each longer or shorter image area; replacing each stored signal with a second signal, if any, whose intensity deviates unequivocally from the intensity of the stored signal, which is generated during the interval following storage of the signal denoting the monitoring of a non-image area in the course of relative movement between said station and a given portion of the strip, and which is indicative of a non-image area; and utilizing the stored signals as a criterion of the length of image areas in the corresponding portions of the strip.

2. The method of claim 1, wherein said utilizing step includes computing the number of stored second signals during monitoring of a given portion of the strip.

3. The method of claim 1, wherein said utilizing step includes ascertaining the frequency at which second signals replace stored signals during the periods which elapse for the monitoring of a given portion of the strip.

4. A method of automatically ascertaining the locations and the length of image areas, particularly film frames, in each of a series of successive portions of an elongated strip of photosensitive material wherein portions having longer image areas alternate at random with portions having shorter image areas and wherein successive image areas of each portion alternate with non-image areas, particularly with frame lines, comprising the steps of effecting a relative movement between the strip and a monitoring station; photoelectrically monitoring at said station the radiation-transmissivity of successive narrow transversely extending increments of the strip during successive intervals which elapse for relative movement between said station and a longer image area and generating signals denoting the monitored transmissivity whereby the intensity of signals which are generated during monitoring of non-image areas deviates from that of signals which are generated during monitoring of image areas; storing the signal which is generated as a result of monitoring the non-image area in front of each longer or shorter image area; replacing each stored signal with a decond signal, if any, whose intensity deviates at least slightly from the intensity of the stored signal, which is generated during the interval following storage of the signal denoting the monitoring of a non-image area in the course of relative movement between said station and a given portion of the strip, and which is indicative of a non-image area; and utilizing the stored signals as a criterion of the length of image areas in the corresponding portions of the strip, including totalizing the number E of stored signals during monitoring of a given portion of the strip, totalizing the number V of signals, if any, denoting the monitoring of non-image areas preceding longer image areas, and totalizing the number H of second signals if any.

5. The method of claim 4, wherein said utilizing step further comprises classifying the monitored image areas of a given portion of the strip as longer image areas when the total number E of stored signals exceeds two and the total number H of second signals is zero.

6. The method of claim 5, further comprising the steps of comparing the monitored transmissivity with a predetermined maximum transmissivity and, for the purpose of classifying the monitored image areas of a given portion of the strip as longer image areas, increasing the total number E of stored signals to more than three when the signals of such total number E denote a transmissivity which is less than approximately 80 percent of said maximum transmissivity.

7. The method of claim 4, wherein said utilizing step further comprises classifying the monitored image areas of a given portion of the strip as shorter image areas when the total number E of stored signals exceeds two, when at least two signals of such total number are second signals, and if at least one of the following three conditions is also satisfied:

$H = V$, $H + V = E$, and $H + V - 1 = E$.

8. The method of claim 7, further comprising the steps of comparing the monitored transmissivity with a predetermined maximum transmissivity and, for the purpose of classifying the monitored image areas of said given portion of the strip as shorter image areas, increasing the total number E of stored signals to more than three when the signals of such total number E denote a transmissivity which is less than approximately 80 percent of said maximum transmissivity.

9. The method of claim 7, further comprising the steps of providing the strip with first indicia denoting the position of each longer and each shorter image area, and providing the strip with second indicia denoting the boundaries between first and second portions of the strip.

10. The method of claim 7, further comprising the step of ascertaining the ordinal numbers of film portions with shorter image areas.

11. The method of claim 10, further comprising the step of displaying the ordinal numbers of film portions with shorter image areas.

12. The method of claim 7, further comprising the steps of applying to the strip a first indicium at a predetermined distance from the leader of the foremost shorter image area of said given portion of the strip, applying to the strip a second indicium at a predetermined distance from the trailing edge of such foremost shorter image area, and applying additional indicia to the strip at predetermined distances from the leaders of the third and next-following image areas of such given portion of the strip.

13. Apparatus for automatically ascertaining the locations and the length of image areas, particularly film frames, in each of a series of successive portions of an elongated strip of photosensitive material wherein portions having longer image areas alternate at random with portions having shorter image areas and wherein successive image areas of each portion alternate with non-image areas, particularly with frame lines, comprising a photoelectronic radiation-transmissivity monitoring device; means for effecting a relative movement between said monitoring device and the strip so that the monitoring device generates signals denoting the transmissivity of successive relatively narrow transversely extending increments of the strip during successive intervals which elapse for relative movement between said monitoring device and a longer image area whereby the intensity of signals which are generated during monitoring of image areas deviates from that of signals which are generated during monitoring of non-image areas; means for storing the signal which is generated as a result of monitoring the non-image area in front of each shorter or longer image area, including means for replacing each stored signal with a second signal, if any, whose intensity deviates unequivocally from the intensity of the stored signal, which is generated during the interval following storage of the signal denoting the monitoring of a non-image area in the course of relative movement between said monitoring device and a given portion of the strip, and which is indicative of a non-image area; and means for utilizing the stored signals as a criterion of the length of image areas in the corresponding portions of the strip, including means for ascertaining the frequency at which second signals replace stored signals during the periods which elapse for the monitoring of a given portion of the strip.

14. Apparatus for automatically ascertaining the locations and the length of image areas, particularly film frames, in each of a series of successive portions of an elongated strip of photosensitive material wherein portions having longer image areas alternate at random with portions having shorter image areas and wherein successive image areas of each portion alternate with non-image areas, particularly with frame lines, comprising a photoelectronic radiation-transmissivity monitoring device; means for effecting a relative movement between said monitoring device and the strip so that the monitoring device generates signals denoting the transmissivity of successive relatively narrow transversely extending increments of the strip during successive intervals which elapse for relative movement between said monitoring device and a longer image area whereby the intensity of signals which are generated during monitoring of image areas deviates from that of signals which are generated during monitoring of non-image areas; means for storing the signal which is generated as a result of monitoring the non-image area in front of each shorter or longer image area, including means for replacing each stored signal with a second signal, if any, whose intensity deviates at least slightly from the intensity of the stored signal, which is generated during the interval following storage of the signal denoting the monitoring of a non-image area in the course of relative movement between said monitoring device and a given portion of the strip, and which is indicative of a non-image area, and means for counting the number of monitored increments subsequent to storage of a signal denoting the non-image area in front of an image area and for altering the extent of deviation of intensity of a freshly generated signal from the intensity of the then stored signal when the extent of relative movement between the monitoring device and the strip approximates the length of a shorter image area; and means for utilizing the stored signals as a criterion of the length of image areas in the corresponding portions of the strip, including means for ascertaining the frequency at which second signals replace stored signals during the periods which elapse for the monitoring of a given portion of the strip.

15. The apparatus of claim 14, further comprising at least one memory arranged to receive signals from said storing means in response to reception by said storing means of a second signal, and utilizing means including means for cyclically addressing said memory for the presence of signals.

16. The apparatus of claim 15, wherein said utilizing means further comprises means for counting the total number of signals which are transmitted to the memory during monitoring of a given portion of the strip, the total number of non-image areas preceding the longer image areas of a given portion of the strip, and the total number of second signals which are generated during monitoring of a given portion of the strip.

17. Apparatus for automatically ascertaining the locations and the length of image areas, particularly film frames, in each of a series of successive portions of an elongated strip of photosensitive material wherein portions having longer image areas alternate at random with portions having shorter image areas and wherein successive image areas of each portion alternate with non-image areas, particularly with frame lines, comprising a photoelectronic radiation-transmissivity monitoring device; means for effecting a relative movement between said monitoring device and the strip so that the monitoring device generates signals denoting the transmissivity of successive relatively narrow transversely extending increments of the strip during successive intervals which elapse for relative movement between said monitoring device and a longer image area whereby the intensity of signals which are generated during monitoring of image areas deviates from that of signals which are generated during monitoring of non-image areas; means for storing the signal which is generated as a result of monitoring the non-image area in front of each shorter or longer image area, including means for replacing each stored signal with a second signal, if any, whose intensity deviates at least slightly from the intensity of the stored signal, which is generated during the interval following storage of the signal denoting the monitoring of a non-image area in the course of relative movement between said monitoring device and a given portion of the strip, and which is indicative of a non-image area; means for utilizing the stored signals as a criterion of the length of image areas in the corresponding portions of the strip, including means for ascertaining the frequency at which second signals replace stored signals during the periods which elapse for the monitoring of a given portion of the strip; means for applying to the strip first indicia denoting the position of each shorter and each longer image area; and means for applying to the strip second indicia denoting the boundaries between successive portions of the strip.

18. The apparatus of claim 17, wherein said portions of the strip are spliced together end-to-end and the splices between successive portions of the strip constitute said boundaries.

19. Apparatus for automatically ascertaining the locations and the length of image areas, particularly film frames, in each of a series of successive portions of an elongated strip of photosensitive material wherein portions having longer image areas alternate at random with portions having shorter image areas and wherein successive image areas of each portion alternate with non-image areas, particularly with frame lines, comprising a photoelectronic radiation-transmissivity monitoring device; means for effecting a relative movement between said monitoring device and the strip so that the monitoring device generates signals denoting the transmissivity of successive relatively narrow transversely extending increments of the strip during successive intervals which elapse for relative movement between said monitoring device and a longer image area whereby the intensity of signals which are generated during monitoring of image areas deviates from that of signals which are generated during monitoring of non-image areas; means for storing the signal which is generated as a result of monitoring the non-image area in front of each shorter or longer image area, including means for replacing each stored signal with a second signal, if any, whose intensity deviates at least slightly from the intensity of the stored signal, which is generated during the interval following storage of the signal denoting the monitoring of a non-image area in the course of relative movement between said monitoring device and a given portion of the strip, and which is indicative of a non-image area; means for utilizing the stored signals as a criterion of the length of image areas in the corresponding portions of the strip, including means for ascertaining the frequency at which second signals replace stored signals during the periods which elapse for the monitoring of a given portion of the strip; and means for counting the ordinal numbers of successive portions having shorter image areas.

20. The apparatus of claim 19, further comprising means for displaying said ordinal numbers.

* * * * *